United States Patent [19]

Suzuki et al.

[11] Patent Number: 4,895,693
[45] Date of Patent: Jan. 23, 1990

[54] HEADLIGHT OF MOTOR VEHICLE

[75] Inventors: Takanori Suzuki; Hideshi Mori; Kenji Miyazawa; Kazutami Ohishi; Masahito Naganawa, all of Kitawaki, Japan

[73] Assignee: Koito Seisakusho Co., Ltd., Tokyo, Japan

[21] Appl. No.: 251,482

[22] Filed: Sep. 30, 1988

[30] Foreign Application Priority Data

Sep. 30, 1987 [JP] Japan ............... 62-151191[U]
Jul. 29, 1988 [JP] Japan ............... 63-190906

[51] Int. Cl.$^4$ ............................................. B60Q 1/00
[52] U.S. Cl. ............................ 362/61; 362/247; 362/248; 362/245; 362/308
[58] Field of Search ........... 362/61, 80, 82, 83, 362/236, 235, 244, 245, 247, 267, 303, 308, 328, 346, 455, 268, 296, 297, 248

[56] References Cited

U.S. PATENT DOCUMENTS

| | | | |
|---|---|---|---|
| 3,622,778 | 11/1971 | Cibie | 362/247 |
| 3,870,876 | 3/1975 | Puyplat | 362/247 |
| 4,019,045 | 4/1977 | Barrett | 362/267 |
| 4,631,642 | 12/1986 | Brun | 362/61 |
| 4,675,793 | 6/1987 | Capellari et al. | 362/289 |
| 4,677,532 | 6/1987 | Peitz et al. | 362/61 |
| 4,722,033 | 1/1988 | VanDuyn et al. | 362/80 |
| 4,839,785 | 6/1989 | Ohishi | 362/247 |

FOREIGN PATENT DOCUMENTS

| | | | |
|---|---|---|---|
| 0273353 | 7/1988 | European Pat. Off. | 362/61 |
| 1958761 | 11/1978 | Fed. Rep. of Germany | 362/61 |
| 3328788 | 2/1985 | Fed. Rep. of Germany | 315/82 |
| 3525198 | 11/1987 | Fed. Rep. of Germany | 362/82 |
| 450348 | 7/1936 | United Kingdom | 362/268 |

Primary Examiner—Stephen F. Husar
Assistant Examiner—D. M. Cox
Attorney, Agent, or Firm—Sughrue, Mion, Zinn, Macpeak & Seas

[57] ABSTRACT

Disclosed herein is a headlight of double beam type, which comprises a lamp body having one end closed and the other end open; means defining in a given part of the closed end of the lamp body an aperture; a lens covering the open end of the lamp body; an upper beam projecting unit including a first concave light reflective integrally formed on a part of an inner surface of the closed end of the lamp body, and a first light source installed at a center portion of the first concave light reflector; and a lower beam projecting unit including a condensing lens installed in the lamp body at a position facing the aperture, a second concave light reflector detachably connected to the outside of the lamp body in a manner to face the aperture, and a second light source installed at a center portion of the second concave light reflector.

12 Claims, 7 Drawing Sheets

HEADLIGHT OF MOTOR VEHICLE

BACKGROUND OF THE INVENTION

1. Field of the Invention

The present invention relates in general to headlights of motor vehicles, and more particularly to the headlights of a double beam type which has in a single casing both an upper beam projecting unit and a lower beam projecting unit. More specifically, the present invention is concerned with a double beam type headlight whose lower beam projecting unit includes a light source producing a light, a light reflector reflecting the light from the light source forward, a shading plate shading a part of the reflected light from the reflector and a condensing lens through which the light contoured by the shading plate passes forward.

2. Description of the Prior Art

Usually, headlights of motor vehicles nowadays used are of a double beam type which produces selectively upper and lower beams. The upper beam is the light beam intended for a forward distant illumination which is particularly used when the vehicle is not meeting nor following other vehicles, while the lower beam is the light beam intended for a forward neighbouring illumination particularly used when the vehicle is meeting or following other vehicles.

Figure 8:
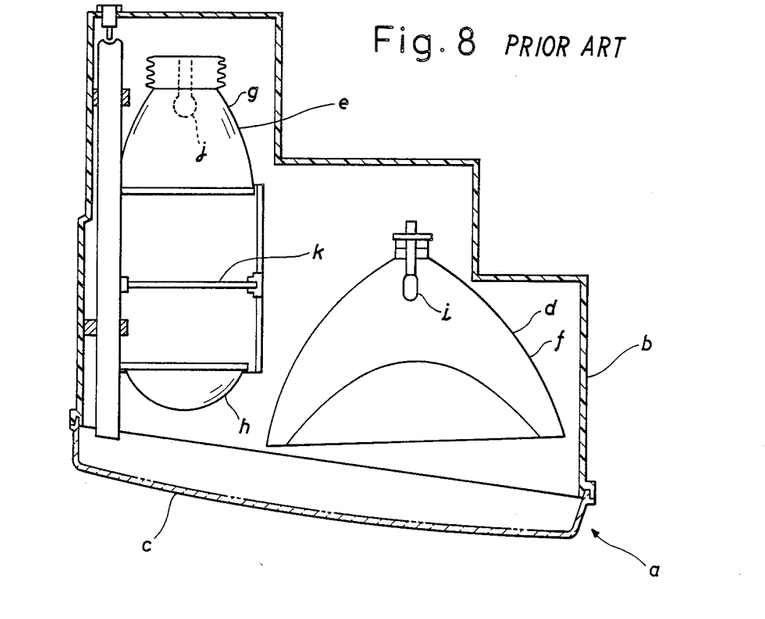
FIG. 8 is a horizontally sectioned view of a conventional double beam type headlight.

One of the conventional headlights of the double beam type is schematically illustrated in FIG. 8 of the accompanying drawings, which is generally designated by reference "a". The headlight "a" comprises a lamp body "b" with a front opening and a lens "c" covering the front opening. Within the lamp body "b" there are separately installed an upper beam projecting unit "d" and a lower beam projecting unit "e". The upper beam projecting unit "d" includes a light source "i", and a parabolic reflector "f" having the light source "i" installed at a central part thereof. While, the lower beam projecting unit "e" includes a light source "j", an ellipsoidal reflector "g" having the light source "j" installed at a central part thereof, a condensing lens "h" installed in front of the reflector "g" and a light shading plate "k" arranged between the reflector "g" and the lens "h". The shading plate "k" is placed on a focus of the lens "h". Due to provision of the shading plate "k", the lower light beam projected forward from the condensing lens "h" has a well-contoured cross-sectional pattern. As will be easily understood from the drawing, the double beam headlight of this conventional type can produce desirable upper and lower beams by selectively energizing the light sources "i" and "j" of the beam projecting units "d" and "e".

However, due to its inherency in construction, the headlight of this type has the following drawbacks.

First, because the lower beam projecting unit "e" is substantially entirely housed in the light body "b", it is difficult or at least troublesome to change or adjust the position of the lower beam projecting unit "e". In fact, long use of the headlight tends to make a displacement of the unit "e" from a right position causing ill-directional projection of the lower beam from the unit "e". Of course, in such a case, adjustment of the unit "e" is required.

Second, since the upper and lower beam projecting units "d" and "e" are independently assembled in the lamp body "b", the headlight requires a large number of parts for its production and thus requires a large number of assembling steps. These cause increase in production cost of the headlight.

SUMMARY OF THE INVENTION

It is therefore an object of the present invention to provide a headlight which is free of the above-mentioned drawbacks.

According to the present invention, there is provided a headlight which features the easiness with which an adjustment of the lower beam projecting unit is achieved.

According to present invention, there is further provided a headlight which is simple in construction and low in cost.

According to the present invention, there is provided a headlight of double beam type, which comprises a lamp body having one end closed and the other end open; means defining in a given part of the closed end of the lamp body an aperture; a lens covering the open end of the lamp body; an upper beam projecting unit including a first concave light reflector integrally formed on a part of an inner surface of the closed end of the lamp body, and a first light source installed at a center portion of the first concave light reflector; and a lower beam projecting unit including a condensing lens installed in the lamp body at a position facing the aperture, a second concave light reflector detachably connected to the outside of the lamp body in a manner to face the aperture, and a second light source installed at a center portion of the second concave light reflector.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 6 of the accompanying drawings, there is shown an embodiment of the present invention, which is a headlight suitable for a motor vehicle.

Figure 1:
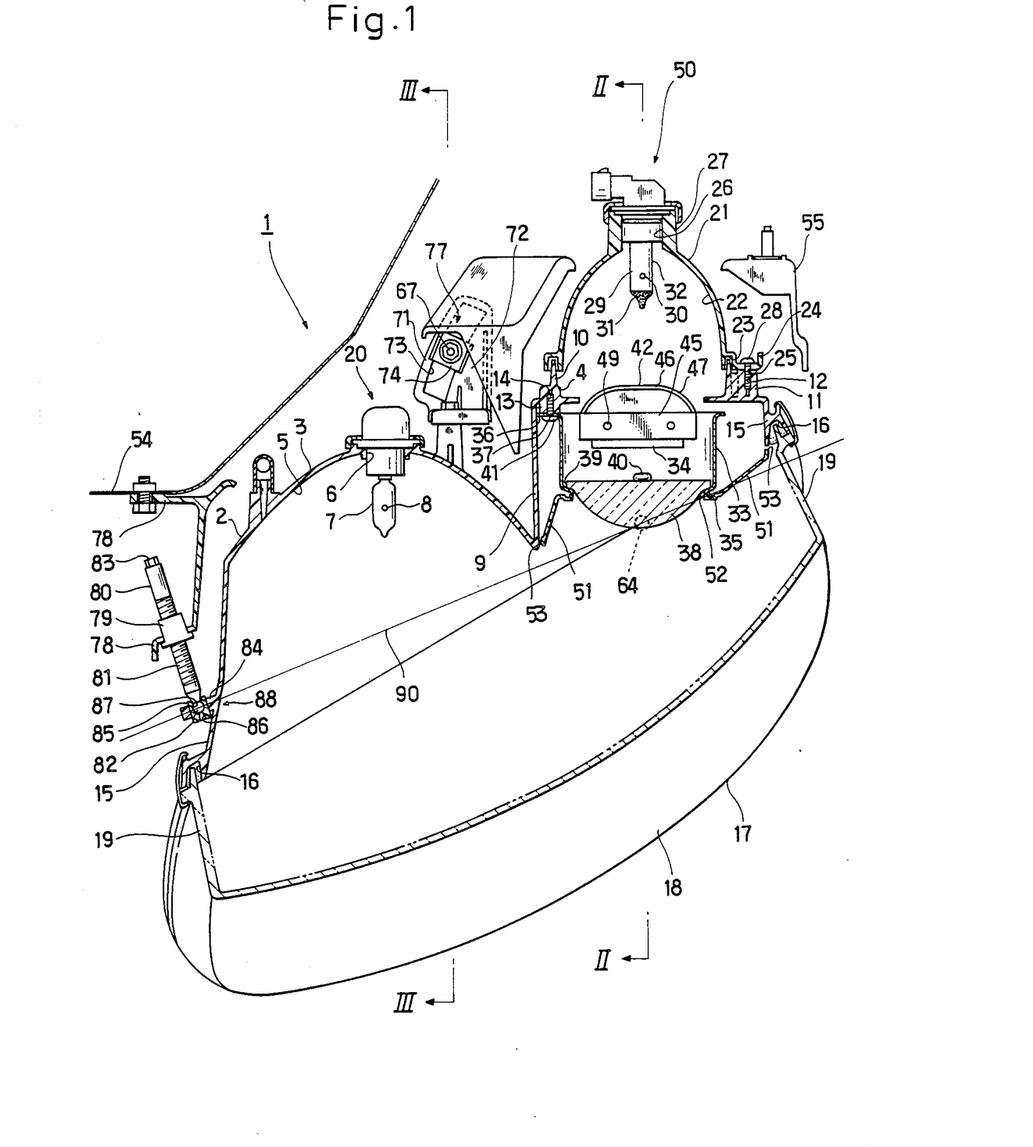
FIG. 1 is a horizontally sectioned view of a headlight according to the present invention.
Figure 2:
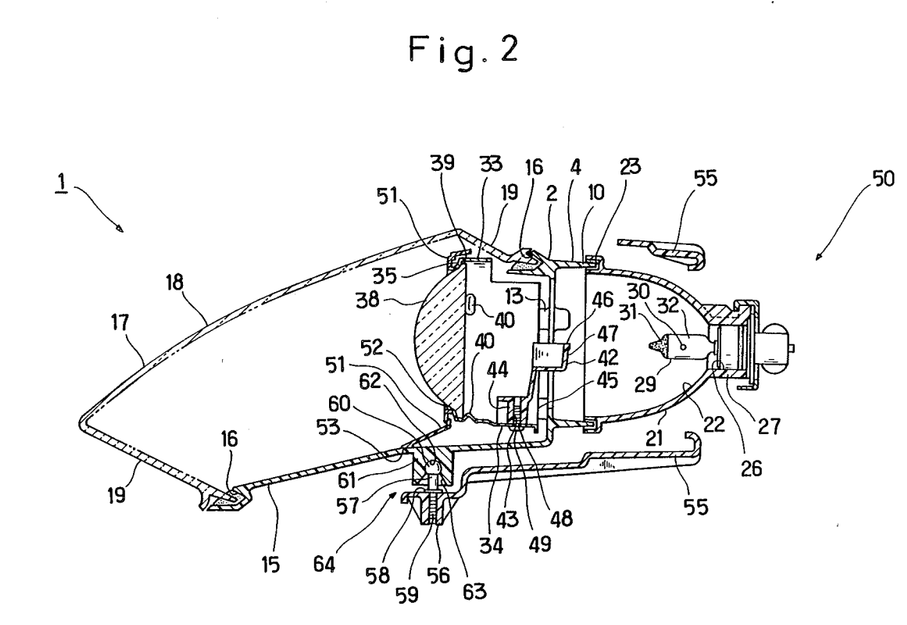
FIG. 2 is a sectional view taken along the line II—II of FIG. 1.

The headlight is generally designated by numeral 1, which comprises a lamp body 2 constructed of a plastic. The lamp body 2 has at its rear part both a parabolically recessed portion 3 and an apertured holding portion 4. The parabolic portion 3 has a light reflecting inner surface 5 and has at its center portion an aperture 6 for detachably mounting an electric bulb 7. The bulb 7 has a filament 8 located at a focus of the parabolic light reflecting surface 5.

The apertured holding portion 4 is shaped like a tubular frame and integrally connected through a longitudinally extending wall 9 to one side of the parabolic portion 3. The portion 4 is provided at its rear part with a tubular connecting portion 10 around which a plurality of spaced studs 11, as is well seen from FIG. 6. Each stud 11 is integral with the lamp body 2 and formed with a threaded bore 12 which faces to the outside.

Figure 5:
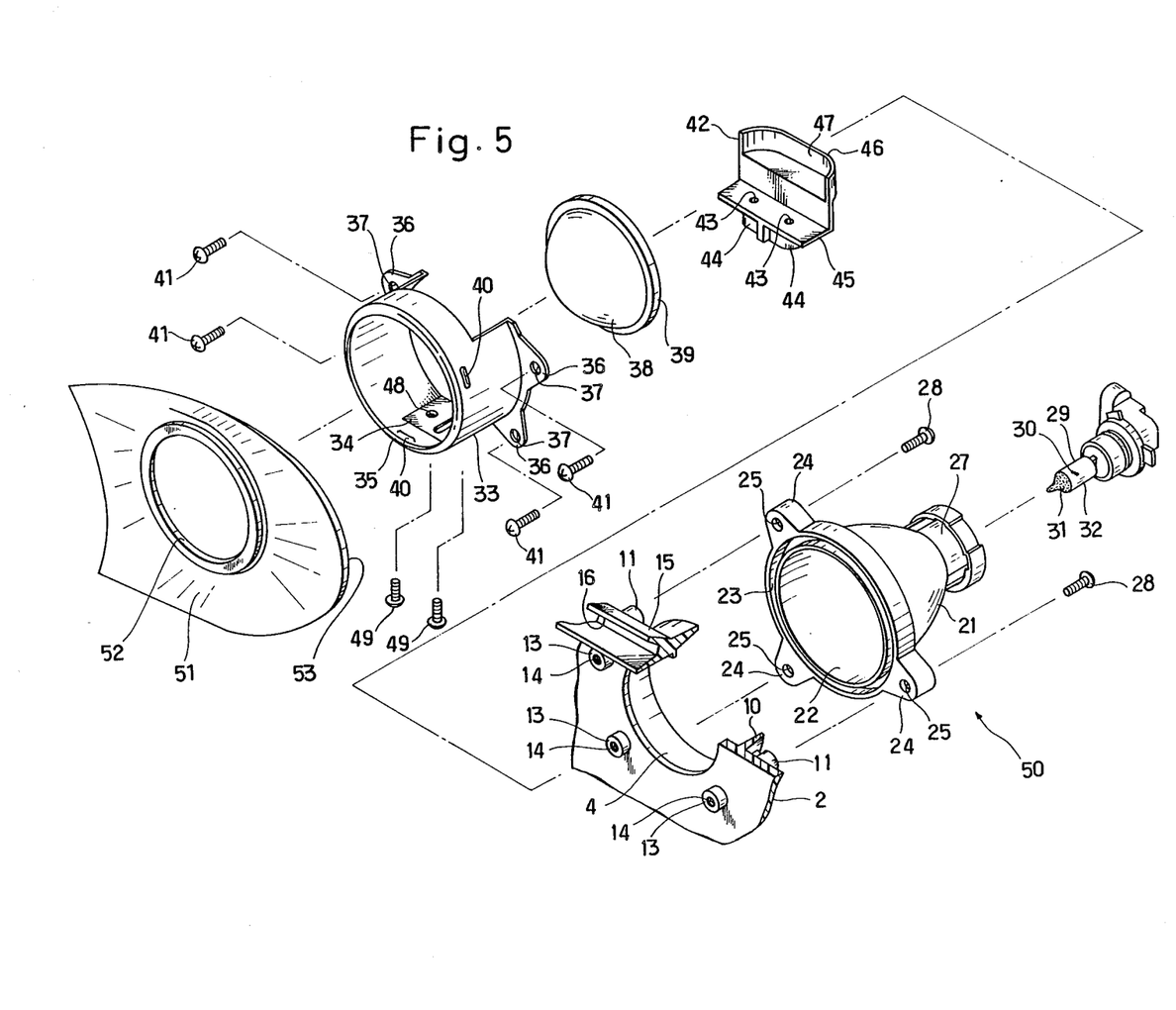
FIG. 5 is an exploded view of a lower beam projecting unit employed in the headlight, which view is taken from a front position of the headlight.

As is seen from FIG. 5, the lamp body 2 has at its inner surface a plurality of studs 13 which surround the apertured holding portion 4. Each stud 13 is formed with a threaded bore 14 which faces the interior of the lamp body 2.

Extended forward from the peripheries of the parabolic portion 3 and the apertured holding portion 4 is a tubular wall 15 which terminates at its framed front end. The framed front end is formed with a circularly extending groove 16.

Designated by numeral 17 is a lens which is constructed of a transparent material, such as a plastic, glass or the like. The lens 17 comprises a smoothly curved front portion 18 which faces forward and a tubular wall portion 19 which extends rearward from the periphery of the front section 18. The rear edge of the wall portion 19 is snugly received in the groove 16 of the lamp body 2 and fastened thereto by means of a known lock band (no numeral).

It is thus to be noted that the parabolic portion 3, the electric bulb 7 and a part of the lens 17 constitute an upper beam projecting unit 20 (see FIG. 1).

Designated by numeral 21 is a separate ellipsoidal light reflector which has an ellipsoidal light reflecting inner surface 22. The reflector 21 has at its front open end an annular rim which is formed with a circularly extending groove 23. As is best seen from FIG. 5, three projections 24 are formed around the annular rim of the reflector 21. The projections 24 are each formed with a through bore 25.

Figure 6:
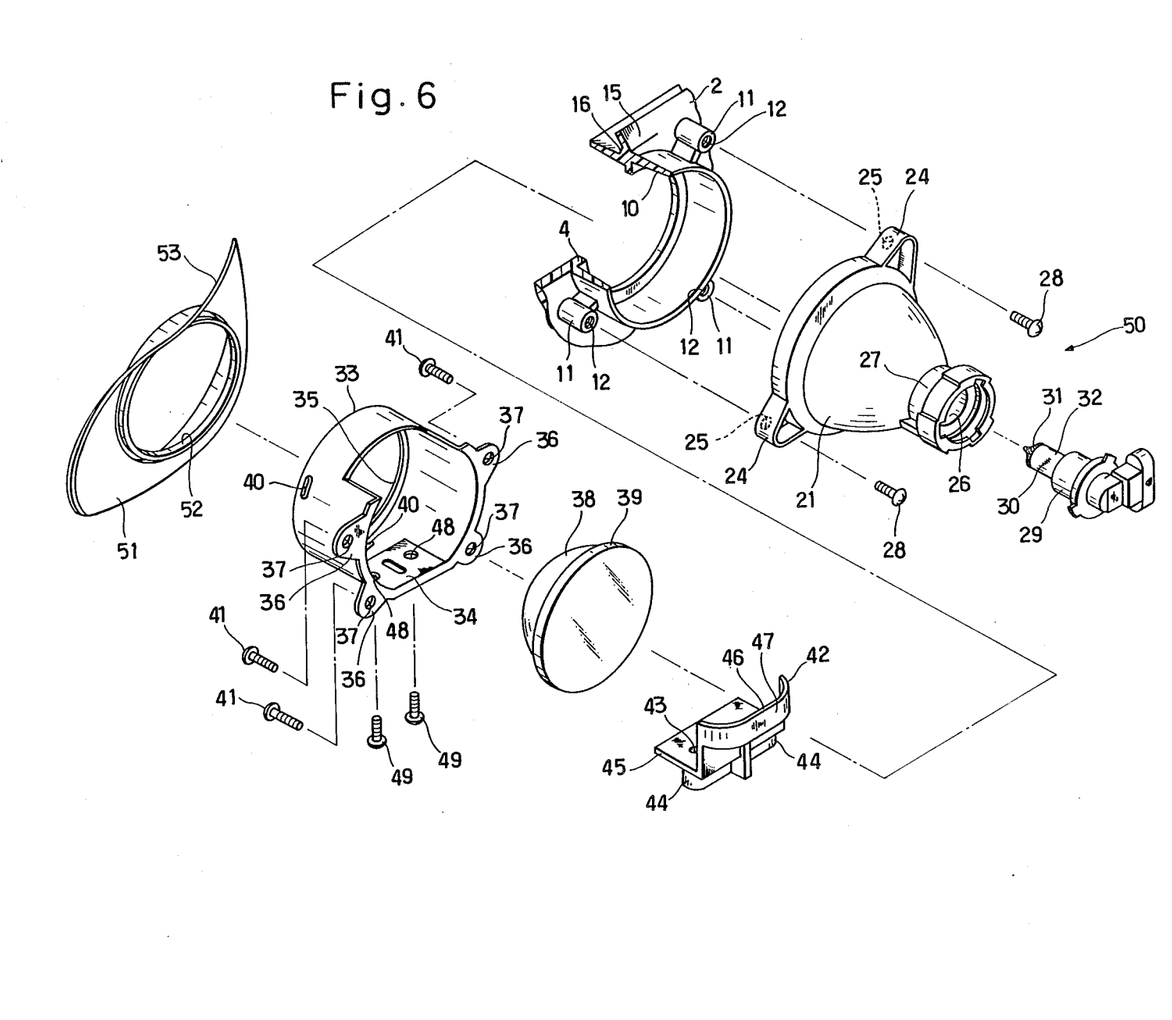
FIG. 6 is a view similar to FIG. 5, but which is taken from a rear position of the headlight.

As is seen from FIG. 6, the ellipsoidal reflector 21 is formed at its rear center portion with an aperture 26 for detachably mounting an electric bulb 29. The aperture 26 is enclosed by a tubular portion 27 which extends rearward from the ellipsoidal reflector 21.

As is best understood from FIG. 5, for assembly, the front open end of the reflector 21 is brought to the rear surface of the apertured holding portion 4 of the lamp body 2, and the groove 23 of the reflector 21 is engaged with the tubular connecting portion 10 mating the projections 24 with their corresponding studs 11. Then, threaded bolts 28 are passed through the bores 25 of the projections 24 and screwed into the threaded bores 12 of the studs 11. With this, the ellipsoidal reflector 21 is tightly connected to the outside of the apertured holding portion 4 of the lamp body 2.

The electric bulb 29 is detachably held by the rear tubular portion 27 of the ellipsoidal reflector 21. It is to be noted that a filament 30 of the bulb 29 is located at a first focus of the ellipsoidal light reflecting surface 22 of the reflector 21. The bulb 29 has a front end coated with a light shading film 31. With this film 31, the light emitted forward from the filament 30 is blocked, and thus only the light emitted radially outwardly from the filament 30 and reflected by the light reflecting surface 22 is permitted to travel forward. The reflected light is converged at a second focus of the light reflecting surface 22.

It is to be noted that the light reflecting surface 22 is not limited to the ellipsoidal surface. That is, the surface 22 may take any shape so long as it can converge the reflected light at a predetermined forward portion thereof.

Designated by numeral 33 is a holding metal tube. As is seen from FIG. 5, the tube 33 has at its upper rear part a rectangular cut and at its lower rear part a flat portion 34. The front edge of the tube 33 is slightly curled inward to provide an engaging part 35. As is seen from FIG. 6, the tube 33 has at its rear end four radially outwardly projecting lugs 36 each having an aperture 37.

Designated by numeral 38 is a circular condensing lens which has a convex front surface and a flat rear surface. As is seen from FIG. 5, the lens 38 has an annular flange 39 formed thereabout. For assembly, the lens 38 is inserted into the tube 33 from the rear end of the same and settled at the front end of the tube 33 having the flange 39 thereof pressed against the engaging part 35 of the tube 33. In order to tightly hold the lens 38 at the front end of the tube 33, suitable portions 40 of the tube 33 are bent or projected inward which abut on the rear surface of the flange 39 of the lens 38.

The tube 33 with the lens 38 mounted therein is brought into the lamp body 2 and the lugs 36 of the same are mated with the studs 13 of the apertured holding portion 4 of the lamp body 2. Threaded bolts 41 are passed through the apertures 37 of the lugs 36 and screwed into the threaded bores 14 of the studs 13. With this, the lens-mounted tube 33 is secured to the inboard side of the apertured holding portion 4.

Designated by numeral 42 is a light shading plate which, as is shown in FIG. 5, comprises a flat base portion 45 and a light shading portion 47 raised from the base portion 45. The base portion 45 has at its lower side two studs 44 each having a threaded bore 43, while the light shading portion 47 has a bow-like screen portion 46.

The light shading plate 42 is put into the lens-mounted tube 33 and placed on the flat portion 34 of the tube 33 in a manner to mate the threaded bores 43 thereof with openings 48 of the flat portion 34. Threaded bolts 49 and 49 are passed through the openings 48 and screwed into the threaded bores 43 of the light shading plate 42, respectively. With this, the light shading plate 42 is fixed to the rear part of the lens-mounted tube 33. The lens 38 has its focus located at a generally middle part of the screen portion 46 of the shading plate 42. The middle part of the screen portion 46 is located just before or behind the second focus of the ellipsoidal reflector 21.

It is thus to be noted that the ellipsoidal reflector 21, the electric bulb 29, the condensing lens 38 and the light shading plate 42 constitute a lower beam projecting unit 50 (see FIG. 1).

Designated by numeral 51 is a dummy reflector which is arranged to cover a clearance defined between the front portion of the lens-mounted tube 33 and an inner surface of a recess which extends forward from the apertured holding portion 4. As is seen from FIG. 5, the dummy reflector 51 has a rimmed circular opening 52 for snugly putting therein the front end of the lens-mounted tube 33. The dummy reflector 51 has an outer periphery 53 shaped in coincidence with the inner surface of the recess.

In the following, the manner in which the headlight 1 of the invention is mounted to a vehicle body will be described.

Designated by numeral 54 in FIG. 1 is a fixed member of the motor vehicle. As is seen from FIG. 2, a housing 55 is arranged to mount therein almost entire of the headlight 1, which is secured to the fixed member 54. The housing 55 has at its front and lower part a mounting boss 56 to which a supporting pin 57 is fixed with its upper part projected upward. The supporting pin 57 has a flange 58 at its middle portion and a threaded lower part 59 which is screwed into the mounting boss 56. The upper part of the pin 57 is formed with an enlarged spherical head 60.

Designated by numeral 61 (see FIG. 2) is an enlarged socket portion provided on a lower part of the lamp body 2. The socket portion 61 is formed with a spherical recess 62 which is merged with a conical mouth portion 63. The spherical recess 62 receives therein the above-mentioned spherical head 60 of the supporting pin 57 so that the headlight 1 can pivot in every directions about the spherical head 60. Thus, the supporting pin 57 and the seat portion 61 constitute a universal pivot device 64 through which the headlight 1 is pivotal in universal directions relative to the fixed housing 55, that is, relative to the vehicle body.

Designated by numeral 65 (see FIG. 3) is a bracket which is secured to the fixed member 54 of the vehicle body. The bracket 65 has upper and lower holders 66a and 66b connected thereto. A position adjusting rod 67 is held by the holders 66a and 66b in a manner to rotate about its axis. The position adjusting rod 67 has a threaded lower half part 68, a spherical lower end 69 and an enlarged head 70. That is, the upper half part of the rod 67 is freely rotatably supported by the upper holder 66a, while, the threaded lower half part 68 of the same is operatively engaged with a threaded bore formed in the lower holder 66b.

Designated by numeral 71 is a connecting plate which is connected to a rear lower part of the parabolic portion 3 of the lamp body 2. The connecting plate 71 has a perpendicularly bent flat portion 72 which, as will be seen from FIG. 1, is formed with an arcuate slot 73. It is to be noted that the arcuate slot 73 extends concentrically with respect to the afore-mentioned universal pivot device 64.

Figure 3:
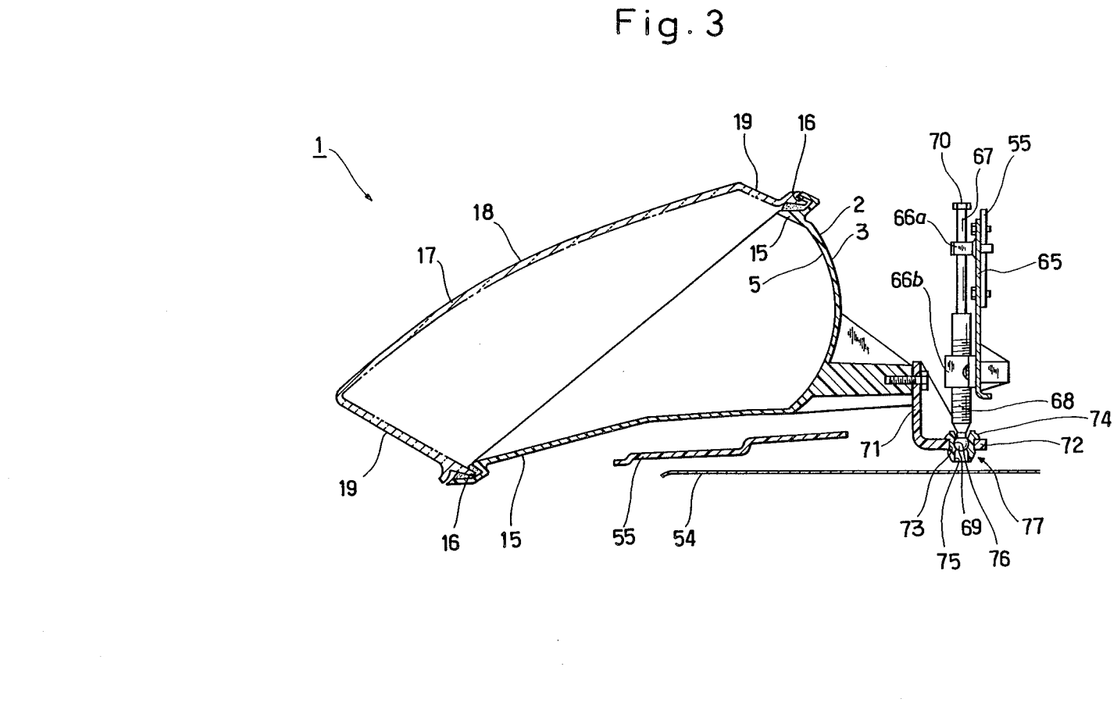
FIG. 3 is a sectional view taken along the line III—III of FIG. 1.

As is seen from FIGS. 1 and 3, a socket member 74 is slidably received in and guided by the arcuate slot 73, which has a through bore 75 with a spherical middle part 76. The spherical middle part 76 receives therein the spherical lower end 69 of the afore-mentioned position adjusting rod 67.

The rod 67, the socket member 74 and the connecting plate 71 thus constitute a vertical position adjusting device by which the headlight 1 can be tilted forward or rearward to a desired angular position. That is, when the adjusting rod 67 is turned in a direction to advance downward, the connecting plate 71 is moved downward thereby tilting the headlight 1 in a clockwise direction in FIG. 3. While, when the adjusting rod 67 is turned in the opposite direction, the connecting plate 71 is raised thereby tilting the headlight 1 in a counterclockwise direction.

Designated by numeral 78 (see FIG. 1) is a bracket which is fixed to the fixed member 54 of the vehicle body. The bracket 78 has at its leading end a holder 79 which has a threaded bore formed therethrough. A position ajusting rod 80 is operatively engaged at its threaded portion 81 with the threaded bore of the holder 79. The rod 80 has at its forward end a spherical portion 82 and at its rear end a head 83.

Designated by numeral 84 is a bracket which is integrally connected to the lamp body 2 at a position near the parabolic portion 3. The bracket 84 tightly holds a socket member 85 which has a through bore 86 with a spherical middle part 87. The spherical middle part 87 snugly receives therein the spherical portion 82 of the position ajusting rod 80.

The rod 80, the spherical portion 82 and the socket member 85 thus constitute a horizontal position adjusting device 88 by which a horizontally angular position of the headlight 1 can be adjusted. That is, when the adjusting rod 80 is turned in a direction to advance forward, the bracket 84 is moved forward thereby horizontally pivoting the headlight 1 in a counterclockwise direction in FIG. 1. While, when the rod 80 is turned in an opposite direction, the headlight 1 is pivoted in a clockwise direction.

Figure 4:
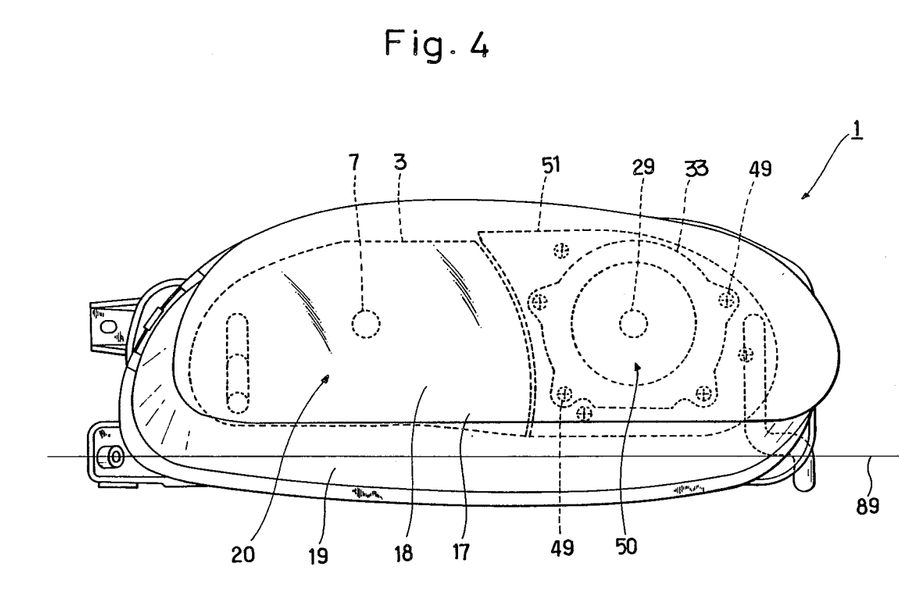
FIG. 4 is a front view of the headlight.

It is to be noted that the universally jointed portions of the universal pivot device 64, the vertical position adjusting device 77 and the horizontal position adjusting device 88 are all placed on or at least near a common horizontal plane 89 (see FIG. 4). In fact, the universally jointed portion of the vertical position adjusting device 77 (see FIG. 3) changes its vertical position when the adjusting rod 70 is turned.

In the following, the step for adjusting the angle of the light beam emitted from the headlight 1 will be described.

In order to adjust the vertical angle of the light beam, the vertical position adjusting device 77 is manipulated (see FIG. 3). That is, when the position adjusting rod 67 is turned in a given direction by given times, the headlight 1 is tilted upward or downward about an imaginary axis 90 which connects the universally jointed portion of the universal pivot device 64 and that of the horizontal position adjusting device 88, and finally tilted to a desired vertically angular position. With this, the vertical angle of the light beam from the headlight 1 can be adjusted. Because the imaginary axis 90 lies on the common "horizontal" plane 89, the pivotal movement of the headlight 1 caused by the manipulation of the adjusting rod 67 has substantially no component of movement in horizontal direction.

In order to adjust the horizontal angle of the light beam emitted from the headlight 1, the horizontal position adjusting device 88 (see FIG. 1) is manipulated. That is, when the adjusting rod 80 is turned in a given direction by given times, the headlight 1 is pivoted rightward or leftward about the universal pivot device 64 and finally pivoted to a desired horizontally angular position. During the horizontal movement of the headlight 1, there is produced a relative movement between the arcuate slot 73 of the connecting plate 72 (see FIG. 3) connected to the headlight 1 and the socket member 74 pivotally connected to the vertical position adjusting rod 67. Because the universally jointed portions of the universal pivot device 64, the vertical position adjusting device 77 and the horizontal position adjusting device 88 lie on or at least near the common horizontal plane, the pivotal movement of the headlight 1 caused by the manipulation of the adjusting rod 80 has substantially no component of movement in vertical direction.

In the following, advantages of the present invention will be described.

First, because the lower beam projecting unit 50 has the bulb-mounted ellipsoidal reflector 21 detachably connected to the lamp body 2 from the outside of the apertured holding portion 4, the check or adjustment of the lower beam projecting unit 50 can be easily carried out by dismantling the reflector 21.

Second, because the ellipsoidal reflector 21 is a separate member from the lamp body 2, it can be constructed with accuracy thereby allowing the lower beam projecting unit 50 to project an optimum light beam. In fact, formation of the ellipsoidal inner surface 22 of the reflector 21 requires a considerably high molding technique because of complicated configulation thereof. Thus, if the reflector is integrally formed on an inner surface of the lamp body 2, accurate configulation of the ellipsoidal reflecting surface will be not expected.

Third, since the parabolic light reflector 5 for the upper beam projecting unit 20 is integrally formed on an inner surface of the lamp body 2, the number of parts of the headlight 1 is reduced correspondingly as compared with the afore-mentioned conventional double beam type headlight of FIG. 8.

Figure 7:
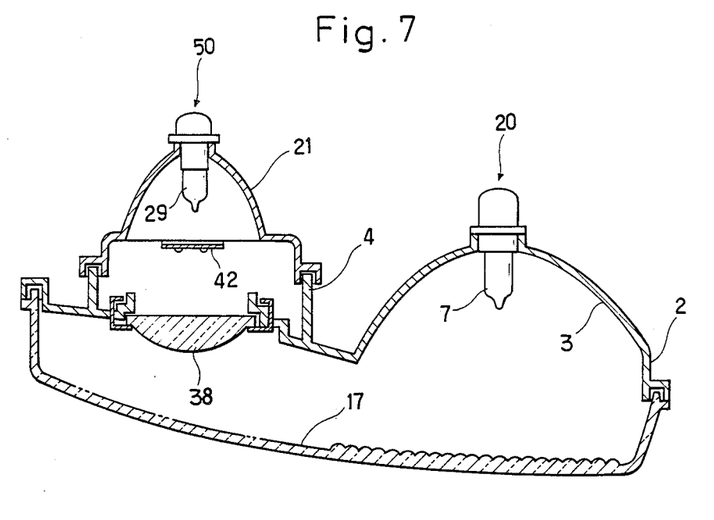
FIG. 7 is a horizontally sectioned view of a modification of the headlight according to the present invention.

Referring to FIG. 7, there is schematically shown a modification of the headlight of the present invention. In this modification, the ellipsoidal reflector 21 of plastic is welded or bonded to the outside of the apertured holding portion 4 of the lamp body 2. This modification possesses the above-mentioned second and third advantages.

What is claimed is:

1. A headlight of double beam type, comprising:
   a lamp body having one end closed and the other end open;
   means defining in a given part of the closed end of said lamp body an aperture;
   a lens covering the open end of the lamp body;
   an upper beam projecting unit including a first concave light reflector integrally formed on a part of the inner surface of said closed end of the lamp body, and a first light source installed at a center portion of said first concave light reflector; and
   a lower beam projecting unit including a condensing lens installed inside said lamp body at a position facing said aperture, a second concave light reflector disposed outside said lamp body and detachably connected to the outside of said lamp body in a manner to face said aperture, and a second light source installed at a center portion of said second concave light reflector.

2. A headlight as claimed in claim 1, in which said second concave light reflector of the lower beam projecting unit is detachably connected at its front open end to the outer surface of said lamp body.

3. A headlight as claimed in claim 2, in which said second concave light reflector has an ellipsoidal light reflecting surface which has first and second focuses.

4. A headlight as claimed in claim 3, in which said second light source of the lower beam projecting unit has its filament located at said first focus of said ellipsoidal light reflecting surface.

5. A headlight as claimed in claim 4, in which said second light source is detachably connected to said center portion of said second concave light reflector.

6. A headlight as claimed in claim 5, in which said lower beam projecting unit further comprises a light shading plate which is located in said lamp body at a position between said aperture and said light light condensing lens.

7. A headlight as claimed in claim 6, in which said light shading plate is located near said second focus of said ellipsoidal light reflecting surface of said second concave light reflector.

8. A headlight as claimed in claim 7, in which said lower beam projecting unit further comprises a tube which contains therein said light shading plate and holds at its innermost end said light condensing lens.

9. A headlight as claimed in claim 8, in which said tube is detachably connected at its outermost end to the inner surface of said lamp body in a manner to align with said aperture.

10. A headlight as claimed in claim 9, in which said front open end of said second concave light reflector is formed with a circularly extending groove, and in which said outside of said lamp body is formed with a tubular portion which is snugly received in said circular extending groove.

11. A headlight as claimed in claim 10, in which said front open end of said second concave light reflector is formed thereabout with radially projected lugs each having a through opening, and in which said tubular portion of said lamp body is formed thereabout with studs each having a threaded bore, wherein said lugs are mated and connected with said studs by means of threaded bolts.

12. A headlight as claimed in claim 11, in which said lower beam projecting unit further comprises a dummy reflector which covers a clearance formed around said tube.

* * * * *